US010776669B1

(12) United States Patent
Raichelgauz et al.

(10) Patent No.: US 10,776,669 B1
(45) Date of Patent: Sep. 15, 2020

(54) SIGNATURE GENERATION AND OBJECT DETECTION THAT REFER TO RARE SCENES

(71) Applicant: Cortica Ltd., Tel Aviv (IL)

(72) Inventors: Igal Raichelgauz, Tel Aviv (IL); Adam Harel, Tel Aviv (IL)

(73) Assignee: CORTICA LTD., Tel Aviv (IL)

( * ) Notice: Subject to any disclaimer, the term of this patent is extended or adjusted under 35 U.S.C. 154(b) by 0 days.

(21) Appl. No.: 16/669,933

(22) Filed: Oct. 31, 2019

Related U.S. Application Data

(60) Provisional application No. 62/827,112, filed on Mar. 31, 2019, provisional application No. 62/827,117, filed on Mar. 31, 2019.

(51) Int. Cl.
*G06K 9/62* (2006.01)

(52) U.S. Cl.
CPC ......... *G06K 9/6262* (2013.01); *G06K 9/6219* (2013.01); *G06K 9/6256* (2013.01)

(58) Field of Classification Search
CPC .. G06K 9/6262; G06K 9/6219; G06K 9/6256; G06K 9/6218; G06K 9/6228; G06K 9/6227; G06K 9/6255
See application file for complete search history.

(56) References Cited

U.S. PATENT DOCUMENTS 4,733,353 A 3/1988 Jaswa
4,932,645 A 6/1990 Schorey et al.
4,972,363 A 11/1990 Nguyen et al.
5,078,501 A 1/1992 Hekker et al.
5,214,746 A 5/1993 Fogel et al.
5,307,451 A 4/1994 Clark
5,412,564 A 5/1995 Ecer
5,436,653 A 7/1995 Ellis et al.
5,568,181 A 10/1996 Greenwood et al.
5,638,425 A 6/1997 Meador et al.
5,745,678 A 4/1998 Herzberg et al.
5,754,938 A 5/1998 Herz et al.
5,763,069 A 6/1998 Jordan
5,806,061 A 9/1998 Chaudhuri et al.
5,835,087 A 11/1998 Herz et al.
5,835,901 A 11/1998 Duvoisin et al.
5,852,435 A 12/1998 Vigneaux et al.
5,870,754 A 2/1999 Dimitrova et al.
5,873,080 A 2/1999 Coden et al.
5,887,193 A 3/1999 Takahashi et al.
5,926,812 A 7/1999 Hilsenrath et al.
(Continued)

FOREIGN PATENT DOCUMENTS

EP 1085464 A3 1/2007
WO 0231764 A2 4/2002
(Continued)

OTHER PUBLICATIONS

Ramos et al. (Detecting unexpected Obstacles for Self-Driving Cars: Fusing Deep learning and Geometric Modeling) 2017 IEEE Intelligent Vehicles Symposium (IV) Jun. 11-14, 2017.*
(Continued)

*Primary Examiner* — Jingge Wu
(74) *Attorney, Agent, or Firm* — Reches Patent

(57) ABSTRACT

Systems, and method and computer readable media that store instructions for calculating signatures, utilizing signatures and the like.

30 Claims, 7 Drawing Sheets

Receiving or generating sensed information 5010
Configuration 5011
Performing a k't iteration expansion operation 5020
NO
k'th iteration expansion results 5120
Performing a k't iteration merge operation 5030
k'th iteration merge results 5130
Change value of index k 5040
END ? 5050
Complete generation of a signature 5060

5000

(56) References Cited

U.S. PATENT DOCUMENTS 5,978,754 A 11/1999 Kumano
5,991,306 A 11/1999 Bums et al.
6,052,481 A 4/2000 Grajski et al.
6,070,167 A 5/2000 Qian et al.
6,076,088 A 6/2000 Paik et al.
6,122,628 A 9/2000 Castelli et al.
6,128,651 A 10/2000 Cezar
6,137,911 A 10/2000 Zhilyaev
6,144,767 A 11/2000 Bottou et al.
6,147,636 A 11/2000 Gershenson
6,163,510 A 12/2000 Lee et al.
6,243,375 B1 6/2001 Speicher
6,243,713 B1 6/2001 Nelson et al.
6,275,599 B1 8/2001 Adler et al.
6,314,419 B1 11/2001 Faisal
6,329,986 B1 12/2001 Cheng
6,381,656 B1 4/2002 Shankman
6,411,229 B2 6/2002 Kobayashi
6,422,617 B1 7/2002 Fukumoto et al.
6,507,672 B1 1/2003 Watkins et al.
6,523,046 B2 2/2003 Liu et al.
6,524,861 B1 2/2003 Anderson
6,546,405 B2 4/2003 Gupta et al.
6,550,018 B1 4/2003 Abonamah et al.
6,557,042 B1 4/2003 He et al.
6,594,699 B1 7/2003 Sahai et al.
6,601,026 B2 7/2003 Appelt et al.
6,611,628 B1 8/2003 Sekiguchi et al.
6,618,711 B1 9/2003 Ananth
6,643,620 B1 11/2003 Contolini et al.
6,643,643 B1 11/2003 Lee et al.
6,665,657 B1 12/2003 Dibachi
6,681,032 B2 1/2004 Bortolussi et al.
6,704,725 B1 3/2004 Lee
6,732,149 B1 5/2004 Kephart
6,742,094 B2 5/2004 Igari
6,751,363 B1 6/2004 Natsev et al.
6,751,613 B1 6/2004 Lee et al.
6,754,435 B2 6/2004 Kim
6,763,069 B1 7/2004 Divakaran et al.
6,763,519 B1 7/2004 McColl et al.
6,774,917 B1 8/2004 Foote et al.
6,795,818 B1 9/2004 Lee
6,804,356 B1 10/2004 Krishnamachari
6,813,395 B1 11/2004 Kinjo
6,819,797 B1 11/2004 Smith et al.
6,877,134 B1 4/2005 Fuller et al.
6,901,207 B1 5/2005 Watkins
6,938,025 B1 8/2005 Lulich et al.
6,985,172 B1 1/2006 Rigney et al.
7,013,051 B2 3/2006 Sekiguchi et al.
7,020,654 B1 3/2006 Najmi
7,023,979 B1 4/2006 Wu et al.
7,043,473 B1 5/2006 Rassool et al.
7,158,681 B2 1/2007 Persiantsev
7,215,828 B2 5/2007 Luo
7,260,564 B1 8/2007 Lynn et al.
7,289,643 B2 10/2007 Brunk et al.
7,299,261 B1 11/2007 Oliver et al.
7,302,089 B1 11/2007 Smits
7,302,117 B2 11/2007 Sekiguchi et al.
7,313,805 B1 12/2007 Rosin et al.
7,340,358 B2 3/2008 Yoneyama
7,346,629 B2 3/2008 Kapur et al.
7,353,224 B2 4/2008 Chen et al.
7,376,672 B2 5/2008 Weare
7,383,179 B2 6/2008 Alves et al.
7,433,895 B2 10/2008 Li et al.
7,464,086 B2 12/2008 Black et al.
7,529,659 B2 5/2009 Wold
7,657,100 B2 2/2010 Gokturk et al.
7,660,468 B2 2/2010 Gokturk et al.
7,805,446 B2 9/2010 Potok et al.
7,860,895 B1 12/2010 Scofield et al.
7,872,669 B2 1/2011 Darrell et al.
7,921,288 B1 4/2011 Hildebrand
7,933,407 B2 4/2011 Keidar et al.
8,023,739 B2 9/2011 Hohimer et al.
8,266,185 B2 9/2012 Raichelgauz et al.
8,285,718 B1 10/2012 Ong et al.
8,312,031 B2 11/2012 Raichelgauz et al.
8,315,442 B2 11/2012 Gokturk et al.
8,345,982 B2 1/2013 Gokturk et al.
8,386,400 B2 2/2013 Raichelgauz et al.
8,396,876 B2 3/2013 Kennedy et al.
8,418,206 B2 4/2013 Bryant et al.
8,442,321 B1 5/2013 Chang et al.
8,457,827 B1 6/2013 Ferguson et al.
8,495,489 B1 7/2013 Everingham
8,635,531 B2 1/2014 Graham et al.
8,655,801 B2 2/2014 Raichelgauz et al.
8,655,878 B1 2/2014 Kulkarni et al.
8,799,195 B2 8/2014 Raichelgauz et al.
8,799,196 B2 8/2014 Raichelquaz et al.
8,818,916 B2 8/2014 Raichelgauz et al.
8,868,861 B2 10/2014 Shimizu et al.
8,886,648 B1 11/2014 Procopio et al.
8,954,887 B1 2/2015 Tseng et al.
8,990,199 B1 3/2015 Ramesh et al.
9,009,086 B2 4/2015 Raichelgauz et al.
9,104,747 B2 8/2015 Raichelgauz et al.
9,165,406 B1 10/2015 Gray et al.
9,311,308 B2 4/2016 Sankarasubramaniam et al.
9,323,754 B2 4/2016 Ramanathan et al.
9,466,068 B2 10/2016 Raichelgauz et al.
9,646,006 B2 5/2017 Raichelgauz et al.
9,679,062 B2 6/2017 Schillings et al.
9,807,442 B2 10/2017 Bhatia et al.
9,875,445 B2 1/2018 Amer et al.
9,984,369 B2 5/2018 Li et al.
2001/0019633 A1 9/2001 Tenze et al.
2001/0034219 A1 10/2001 Hewitt et al.
2001/0038876 A1 11/2001 Anderson
2002/0004743 A1 1/2002 Kutaragi et al.
2002/0010682 A1 1/2002 Johnson
2002/0010715 A1 1/2002 Chinn et al.
2002/0019881 A1 2/2002 Bokhari et al.
2002/0032677 A1 3/2002 Morgenthaler et al.
2002/0038299 A1 3/2002 Zernik et al.
2002/0042914 A1 4/2002 Walker et al.
2002/0072935 A1 6/2002 Rowse et al.
2002/0087530 A1 7/2002 Smith et al.
2002/0087828 A1 7/2002 Arimilli et al.
2002/0091947 A1 7/2002 Nakamura
2002/0107827 A1 8/2002 Benitez-Jimenez et al.
2002/0113812 A1 8/2002 Walker et al.
2002/0126002 A1 9/2002 Patchell
2002/0126872 A1 9/2002 Brunk et al.
2002/0129140 A1 9/2002 Peled et al.
2002/0147637 A1 10/2002 Kraft et al.
2002/0157116 A1 10/2002 Jasinschi
2002/0163532 A1 11/2002 Thomas et al.
2002/0174095 A1 11/2002 Lulich et al.
2002/0184505 A1 12/2002 Mihcak et al.
2003/0004966 A1 1/2003 Bolle et al.
2003/0005432 A1 1/2003 Ellis et al.
2003/0037010 A1 2/2003 Schmelzer
2003/0041047 A1 2/2003 Chang et al.
2003/0089216 A1 5/2003 Birmingham et al.
2003/0093790 A1 5/2003 Logan et al.
2003/0101150 A1 5/2003 Agnihotri et al.
2003/0105739 A1 6/2003 Essafi et al.
2003/0110236 A1 6/2003 Yang et al.
2003/0115191 A1 6/2003 Copperman et al.
2003/0126147 A1 7/2003 Essafi et al.
2003/0140257 A1 7/2003 Peterka et al.
2003/0165269 A1 9/2003 Fedorovskaya et al.
2003/0174859 A1 9/2003 Kim
2003/0184598 A1 10/2003 Graham
2003/0200217 A1 10/2003 Ackerman
2003/0217335 A1 11/2003 Chung et al.
2003/0229531 A1 12/2003 Heckerman et al.
2004/0095376 A1 5/2004 Graham et al.
2004/0098671 A1 5/2004 Graham et al.

(56) References Cited

U.S. PATENT DOCUMENTS

2004/0111432 A1 6/2004 Adams et al.
2004/0117638 A1 6/2004 Monroe
2004/0128511 A1 7/2004 Sun et al.
2004/0153426 A1 8/2004 Nugent
2004/0162820 A1 8/2004 James et al.
2004/0267774 A1 12/2004 Lin et al.
2005/0021394 A1 1/2005 Miedema et al.
2005/0080788 A1 4/2005 Murata
2005/0114198 A1 5/2005 Koningstein et al.
2005/0131884 A1 6/2005 Gross et al.
2005/0163375 A1 7/2005 Grady
2005/0172130 A1 8/2005 Roberts
2005/0177372 A1 8/2005 Wang et al.
2005/0226511 A1 10/2005 Short
2005/0238198 A1 10/2005 Brown et al.
2005/0238238 A1 10/2005 Xu et al.
2005/0249398 A1 11/2005 Khamene et al.
2005/0256820 A1 11/2005 Dugan et al.
2005/0262428 A1 11/2005 Little et al.
2005/0281439 A1 12/2005 Lange
2005/0289163 A1 12/2005 Gordon et al.
2005/0289590 A1 12/2005 Cheok et al.
2006/0004745 A1 1/2006 Kuhn et al.
2006/0015580 A1 1/2006 Gabriel et al.
2006/0020958 A1 1/2006 Allamanche et al.
2006/0033163 A1 2/2006 Chen
2006/0050993 A1 3/2006 Stentiford
2006/0069668 A1 3/2006 Braddy et al.
2006/0080311 A1 4/2006 Potok et al.
2006/0112035 A1 5/2006 Cecchi et al.
2006/0129822 A1 6/2006 Snijder et al.
2006/0217818 A1 9/2006 Fujiwara
2006/0217828 A1 9/2006 Hicken
2006/0218191 A1 9/2006 Gopalakrishnan
2006/0224529 A1 10/2006 Kermani
2006/0236343 A1 10/2006 Chang
2006/0242130 A1 10/2006 Sadri et al.
2006/0248558 A1 11/2006 Barton et al.
2006/0251338 A1 11/2006 Gokturk et al.
2006/0253423 A1 11/2006 McLane et al.
2006/0288002 A1 12/2006 Epstein et al.
2007/0022374 A1 1/2007 Huang et al.
2007/0033170 A1 2/2007 Sull et al.
2007/0038614 A1 2/2007 Guha
2007/0042757 A1 2/2007 Jung et al.
2007/0061302 A1 3/2007 Ramer et al.
2007/0067304 A1 3/2007 Ives
2007/0074147 A1 3/2007 Wold
2007/0083611 A1 4/2007 Farago et al.
2007/0091106 A1 4/2007 Moroney
2007/0130159 A1 6/2007 Gulli et al.
2007/0136782 A1 6/2007 Ramaswamy et al.
2007/0156720 A1 7/2007 Maren
2007/0244902 A1 10/2007 Seide et al.
2007/0253594 A1 11/2007 Lu et al.
2007/0286482 A1* 12/2007 Au .................... G06K 9/00771
382/173
2007/0298152 A1 12/2007 Baets
2008/0049789 A1 2/2008 Vedantham et al.
2008/0072256 A1 3/2008 Boicey et al.
2008/0079729 A1 4/2008 Brailovsky
2008/0152231 A1 6/2008 Gokturk et al.
2008/0159622 A1 7/2008 Agnihotri et al.
2008/0165861 A1 7/2008 Wen et al.
2008/0201299 A1 8/2008 Lehikoinen et al.
2008/0201314 A1 8/2008 Smith et al.
2008/0201361 A1 8/2008 Castro et al.
2008/0228995 A1 9/2008 Tan et al.
2008/0237359 A1 10/2008 Silverbrook et al.
2008/0247543 A1 10/2008 Mick et al.
2008/0253737 A1 10/2008 Kimura et al.
2008/0263579 A1 10/2008 Mears et al.
2008/0270373 A1 10/2008 Oostveen et al.
2008/0294278 A1 11/2008 Borgeson et al.
2008/0307454 A1 12/2008 Ahanger et al.
2008/0313140 A1 12/2008 Pereira et al.
2009/0024641 A1 1/2009 Quigley et al.
2009/0037088 A1 2/2009 Taguchi
2009/0043637 A1 2/2009 Eder
2009/0096634 A1 4/2009 Emam et al.
2009/0125544 A1 5/2009 Brindley
2009/0157575 A1 6/2009 Schobben et al.
2009/0165031 A1 6/2009 Li et al.
2009/0172030 A1 7/2009 Schiff et al.
2009/0208106 A1 8/2009 Dunlop et al.
2009/0208118 A1 8/2009 Csurka
2009/0216761 A1 8/2009 Raichelgauz et al.
2009/0220138 A1 9/2009 Zhang et al.
2009/0245573 A1 10/2009 Saptharishi et al.
2009/0254572 A1 10/2009 Redlich et al.
2009/0282218 A1 11/2009 Raichelgauz et al.
2009/0297048 A1 12/2009 Slotine et al.
2010/0042646 A1 2/2010 Raichelgauz et al.
2010/0082684 A1 4/2010 Churchill et al.
2010/0104184 A1 4/2010 Bronstein et al.
2010/0125569 A1 5/2010 Nair et al.
2010/0162405 A1 6/2010 Cook et al.
2010/0191391 A1 7/2010 Zeng
2010/0198626 A1 8/2010 Cho et al.
2010/0212015 A1 8/2010 Jin et al.
2010/0284604 A1 11/2010 Chrysanthakopoulos
2010/0293057 A1 11/2010 Haveliwala et al.
2010/0312736 A1 12/2010 Kello
2010/0318493 A1 12/2010 Wessling
2010/0325138 A1 12/2010 Lee et al.
2010/0325581 A1 12/2010 Finkelstein et al.
2011/0035373 A1 2/2011 Berg et al.
2011/0055585 A1 3/2011 Lee
2011/0164180 A1 7/2011 Lee
2011/0164810 A1 7/2011 Zang et al.
2011/0216209 A1 9/2011 Fredlund et al.
2011/0218946 A1 9/2011 Stern et al.
2011/0276680 A1 11/2011 Rimon
2011/0296315 A1 12/2011 Lin et al.
2012/0131454 A1 5/2012 Shah
2012/0136853 A1 5/2012 Kennedy et al.
2012/0167133 A1 6/2012 Carroll et al.
2012/0179642 A1 7/2012 Sweeney et al.
2012/0185445 A1 7/2012 Borden et al.
2012/0207346 A1 8/2012 Kohli et al.
2012/0221470 A1 8/2012 Lyon
2012/0227074 A1 9/2012 Hill et al.
2012/0239690 A1 9/2012 Asikainen et al.
2012/0239694 A1 9/2012 Avner et al.
2012/0265735 A1 10/2012 McMillan et al.
2012/0294514 A1 11/2012 Saunders et al.
2012/0299961 A1 11/2012 Ramkumar et al.
2012/0301105 A1 11/2012 Rehg et al.
2012/0331011 A1 12/2012 Raichelgauz et al.
2013/0043990 A1 2/2013 Al-Jafar
2013/0066856 A1 3/2013 Ong et al.
2013/0067364 A1 3/2013 Bemtson et al.
2013/0086499 A1 4/2013 Dyor et al.
2013/0089248 A1 4/2013 Remiszewski et al.
2013/0151522 A1 6/2013 Aggarwal et al.
2013/0159298 A1 6/2013 Mason et al.
2013/0226930 A1 8/2013 Amgren et al.
2013/0227023 A1 8/2013 Raichelgauz et al.
2013/0283401 A1 10/2013 Pabla et al.
2013/0346412 A1 12/2013 Raichelgauz et al.
2014/0019264 A1 1/2014 Wachman et al.
2014/0025692 A1 1/2014 Pappas
2014/0125703 A1 5/2014 Roveta et al.
2014/0147829 A1 5/2014 Jerauld
2014/0149918 A1 5/2014 Asokan et al.
2014/0152698 A1 6/2014 Kim et al.
2014/0156691 A1 6/2014 Conwell
2014/0169681 A1 6/2014 Drake
2014/0176604 A1 6/2014 Venkitaraman et al.
2014/0193077 A1 7/2014 Shiiyama et al.
2014/0198986 A1 7/2014 Marchesotti
2014/0201330 A1 7/2014 Lopez et al.
2014/0245463 A1* 8/2014 Suryanarayanan ..... G06F 21/31
726/28

(56) References Cited

U.S. PATENT DOCUMENTS

| | | | |
|---|---|---|---|
| 2014/0250032 | A1 | 9/2014 | Huang et al. |
| 2014/0282655 | A1 | 9/2014 | Roberts |
| 2014/0300722 | A1 | 10/2014 | Garcia |
| 2014/0330830 | A1 | 11/2014 | Raichelgauz et al. |
| 2014/0341476 | A1 | 11/2014 | Kulick et al. |
| 2014/0363044 | A1 | 12/2014 | Williams et al. |
| 2015/0052089 | A1 | 2/2015 | Kozloski et al. |
| 2015/0100562 | A1 | 4/2015 | Kohlmeier et al. |
| 2015/0117784 | A1 | 4/2015 | Lin et al. |
| 2015/0120627 | A1 | 4/2015 | Hunzinger et al. |
| 2015/0127516 | A1 | 5/2015 | Studnitzer et al. |
| 2015/0248586 | A1 | 9/2015 | Gaidon et al. |
| 2015/0254344 | A1 | 9/2015 | Kulkarni et al. |
| 2015/0286742 | A1 | 10/2015 | Zhang et al. |
| 2015/0286872 | A1 | 10/2015 | Medioni et al. |
| 2015/0324356 | A1 | 11/2015 | Gutierrez et al. |
| 2015/0332588 | A1 | 11/2015 | Bulan et al. |
| 2015/0339517 | A1* | 11/2015 | Liu .................... G06K 9/00288 382/115 |
| 2016/0007083 | A1 | 1/2016 | Gurha |
| 2016/0026707 | A1 | 1/2016 | Ong et al. |
| 2016/0132194 | A1 | 5/2016 | Grue et al. |
| 2016/0132705 | A1* | 5/2016 | Kovarik ............. G06K 7/10376 340/10.3 |
| 2016/0221592 | A1 | 8/2016 | Puttagunta et al. |
| 2016/0275766 | A1 | 9/2016 | Venetianer et al. |
| 2016/0306798 | A1 | 10/2016 | Guo et al. |
| 2016/0350930 | A1* | 12/2016 | Lin .......................... G06K 9/66 |
| 2017/0014684 | A1* | 1/2017 | Burroughs .............. G06F 19/00 |
| 2017/0017638 | A1 | 1/2017 | Satyavarta et al. |
| 2017/0039432 | A1* | 2/2017 | Bulan ................ H04N 5/23229 |
| 2017/0113664 | A1* | 4/2017 | Nix ..................... G06F 11/3072 |
| 2017/0154241 | A1 | 6/2017 | Shambik et al. |
| 2018/0108258 | A1 | 4/2018 | Dilger |
| 2018/0157903 | A1 | 6/2018 | Tu et al. |
| 2018/0189613 | A1 | 7/2018 | Wolf et al. |
| 2018/0240221 | A1* | 8/2018 | Rijnders ................. G06T 5/002 |
| 2018/0373929 | A1 | 12/2018 | Ye |
| 2019/0033447 | A1* | 1/2019 | Chan ....................... G01S 15/89 |
| 2019/0096135 | A1 | 3/2019 | Mutto et al. |
| 2019/0171912 | A1 | 6/2019 | Vallespi-Gonzalez et al. |
| 2019/0235521 | A1* | 8/2019 | Mudalige .............. G01S 13/867 |
| 2019/0279046 | A1 | 9/2019 | Han et al. |
| 2019/0304102 | A1 | 10/2019 | Chen et al. |

FOREIGN PATENT DOCUMENTS

| | | | |
|---|---|---|---|
| WO | 2003067467 | A1 | 8/2003 |
| WO | 2005027457 | A1 | 3/2005 |
| WO | 2007049282 | A2 | 5/2007 |
| WO | 2014076002 | A1 | 5/2014 |
| WO | 2014137337 | A1 | 9/2014 |
| WO | 2016040376 | A1 | 3/2016 |
| WO | 2016070193 | A1 | 5/2016 |

OTHER PUBLICATIONS

Lin et al., "Summarization of Large Scale Social Network Activity", DOI: 10.1109/ ICASSP.2009.4960375, Apr. 2009, pp. 3481-3484.

Santos et al., "SCORM-MPEG: An ontology of interoperable metadata for Multimedia and e-Learning", DOI: 10.1109/ SOFTCOM.2015. 7314122, Nov. 02, 2015, Pages 5.

Scheper et al., "Nonlinear dynamics in neural computation", ESANN, 14th European Symposium on Artificial Neural Networks, Jan. 2006, pp. 491-502.

Schneider et al., "A Robust Content Based Digital Signature for Image Authentication", 3rd IEEE International Conference on Image Processing, Sep. 19, 2006, pp. 227-230.

Semizarov et al.,"Specificity of short interfering RNA determined through gene expression signatures", PNAS vol. 100 (11), May 27, 2003, pp. 6347-6352.

Sheng Hua et al., "Robust video signature based on ordinal measure", ICIP '04. 2004 International Conference on Image Processing, Oct. 2004, pp. 685-688.

Stolberg et al., "HiBRID-SoC: a multi-core SoC architecture for multimedia signal processing. Vlsi Signal Processing",7 Journal of Vlsi Signal Processing vol. 41(1), Aug. 2005, pp. 9-20.

Theodoropoulos et al., "Simulating asynchronous architectures on transputer networks", 4th Euromicro Workshop on Parallel and Distributed Processing, Braga, Portugal, 1996, pp. 274-281.

Vailaya et al., "Content-Based Hierarchical Classification of Vacation Images", International Conference on Multimedia Computing and Systems, vol. 1, DOI- 10.1109/MMCS.1999.779255, Jul. 1999, pp. 518-523.

Verstraeten et al., "Isolated word recognition with the Liquid State Machine: a case study", Information Processing Letters, vol. 95(6), Sep. 2005, pp. 521-528.

Vallet et al.,"Personalized Content Retrieval in Context Using Ontological Knowledge", in IEEE Transactions on . Circuits and Systems for Video Technology, vol. 17, No. 3, Mar. 2007, pp. 336-346.

Wang et al., "Classifying objectionable websites based on image content"Interactive Distributed Multimedia Systems and Telecommunication Services, vol. 1483, 1998, pp. 113-124.

Wang et al., "A Signature for Content-Based Image Retrieval Using a Geometrical Transform", 6th ACM International Conference on Multimedia, Multimedia 1998, pp. 229-234.

Ware et al., "Locating and identifying components in a robot's workspace using a hybrid computer architecture", 10th International Symposium on Intelligent Control, 1995, pp. 139-144.

Li et al. "Exploring Visual and Motion Saliency for Automatic Video Object Extraction", in IEEE Transactions on Image Processing, vol. 22, No. 7, Jul. 2013, pp. 2600-2610.

Colin Whitby-Strevens, "The transputer", 12th annual international symposium on Computer architecture (ISCA), IEEE Computer Society Press, Jun. 1985, pp. 292-300.

Wilk et al., "The potential of social-aware multimedia prefetching on mobile devices", International Conference and Workshops on Networked Systems (NetSys 2015) Mar. 2015, Page 1.

Andrew William Hogue, "Tree pattern inference and matching for wrapper induction on the World Wide Web", May 13, 2014, pp. 106.

Liu et al. "Instant Mobile Video Search With Layered Audio-Video Indexing and Progressive Transmission", IEEE Transactions on Multimedia 16(8, Dec. 2014, pp. 2242-2255.

Raichelgauz et al., "Natural Signal Classification by Neural Cliques and Phase-Locked Attractors", International Conference of the IEEE Engineering in Medicine and Biology Society, 2006, pp. 6693-6697.

Lin et al., "Robust digital signature for multimedia authentication", IEEE Circuits and Systems Magazine, vol. 3, No. 4, 2003, pp. 23-26.

Zang et al., "A New Multimedia Message Customizing Framework for mobile Devices", IEEE International Conference on Multimedia and Expo, 2007, pp. 1043-1046.

Zhou et al., "Ensembling neural networks: Many could be better than all", Artificial Intelligence, vol. 137, 2002, pp. 239-263.

Zhou et al., "Medical diagnosis with C4.5 rule preceded by artificial neural network ensemble", IEEE Transactions on Information Technology in Biomedicine, vol. 7, No. 1, Mar. 2003, pp. 37-42.

Zhu et al., "Technology-Assisted Dietary Assessment", SPIE. 6814. 681411, 2008, p. 1.

Zou et al., "A content-based image authentication system with lossless data hiding", International Conference on Multimedia and Expo. ICME, 2003, pp. 11(213)-11(216).

Akira et al., "Columbia University's Baseline Detectors for 374 LSCOM Semantic Visual Concepts", Columbia University ADVENT Technical Report #222-2006-8, Mar. 20, 2007, Pages 17.

Amparo et al., "Real Time Speaker Localization and Detection System for Camera Steering in Multiparticipant Videoconferencing Environments", IEEE International Conference on Acoustics, Speech and Signal Processing 2011,pp. 2592-2595.

Boari et al., "Adaptive Routing for Dynamic Applications in Massively Parallel Architectures", IEEE Parallel & Distributed Technology: Systems & Applications (vol. 3, Issue: 1, Spring 1995), pp. 61-74.

(56) References Cited

OTHER PUBLICATIONS

Boyer et al., "A Crossover Operator for Evolutionary Algorithms Based on Population Features", Journal of Artificial Intelligence Research vol. 24 (2005) pp. 1-48.
Brecheisen et al., ""Hierarchical Genre Classification for Large Music Collections"", IEEE International Conference on Multimedia and Expo (ICME) 2006, pp. 1385-1388.
Burgsteiner et al., "Movement prediction from real-world images using a liquid state machine" ,International Conference on Industrial, Engineering and Other Applications of Applied Intelligent Systems IEA/AIE 2005: Innovations in Applied Artificial Intelligence, pp. 121-130.
Cernansky et al., "Feed-forward echo state networks", IEEE International Joint Conference on Neural Networks, 2005,7 vol. 3, pp. 1479-1482.
Chang et al., "VideoQ: a fully automated video retrieval system using motion sketches" , Fourth IEEE Workshop on Applications of Computer Vision. WACV'98 (Cat. No. 98EX201), Oct. 19-21, 1998, pp. 270-271.
Cho et al.,"Efficient Motion-Vector-Based Video Search Using Query by Clip", IEEE International Conference on Multimedia and Expo (ICME) (IEEE Cat. No. 04TH8763), Year: 2004, vol. 2, pp. 1027-1030.
Clement et al."Speaker diarization of heterogeneous web video files: a preliminary study", IEEE International Conference on Acoustics, Speech and Signal Processing (ICASSP), May 22-27, 2011 pp. 4432-4435.
Cococcioni et al., "Automatic diagnosis of defects of rolling element bearings based on computational intelligence techniques", Ninth International Conference on Intelligent Systems Design and Applications, Nov. 30-Dec. 2, 2009, pp. 970-975.
Emami et al., "Role of Spatiotemporal Oriented Energy Features for Robust Visual Tracking in Video Surveillance", IEEE Ninth International Conference on Advanced Video and Signal-Based Surveillance Sep. 18-21, 2012, pp. 349-354.
Fathy et al., "A parallel design and implementation for backpropagation neural network using MIMD architecture", 8th Mediterranean Electrotechnical Conference on Industrial Applications in Power Systems, Computer Science and Telecommunications (MELECON 96) , May 16, 1996, 1472-1476.
Foote et al.," Content-based retrieval of music and audio", Multimedia Storage and Archiving Systems II, Published in SPIE Proceedings vol. 3229, Oct. 6, 1997, p. 1.
Freisleben et al., "Recognition of fractal images using a neural network",New Trends in Neural Computation, International Workshop on Artificial Neural Networks, IWANN '93 Sitges, Spain, Jun. 9-11, 1993: , pp. 632-637.
Ivan Garcia, "Solving the Weighted Region Least Cost Path Problem Using Transputers", Naval Postgraduate School Monterey, California ,1989 Pages 73.
Gomes et al., "Audio Watermarking and Fingerprinting: For Which Applications?", Journal of New Music Research 32(1) Mar. 2003 p. 1.
Gong et al., "A Knowledge-Based Mediator for Dynamic Integration of Heterogeneous Multimedia Information Sources", International Symposium on Intelligent Multimedia, Video and Speech Processing, Oct. 20-22, 2004, pp. 467-470.
Guo et al., "AdOn: an Intelligent Overlay Video Advertising System", https://doi.org/10.1145/1571941.1572049, Jul. 2009, pp. 628-629.
Howlett et al., "A Multi-Computer Neural Network Architecture in a Virtual Sensor System Application", International Journal of Knowledge-Based and Intelligent Engineering Systems, vol. 4, Published-Apr. 2000, pp. 86-93.
Hua et al., "Robust Video Signature Based on Ordinal Measure", International Conference on Image Processing ICIP '04. 2004, Oct. 24-27, 2004, Pages 5.
Iwamoto et al, "Image Signature Robust to Caption Superimposition for Video Sequence Identification", 2006 International Conference on Image Processing ,IEEE, Atlanta, GA, Oct. 8-11, 2006, pp. 3185-3188.
Herbert Jaeger, " The" echo state" approach to analysing and training recurrent neural networks", Bonn, Germany: German National Research Center for Information Technology GMD Technical Report, 148 ,2001, Pages 43.
Jianping Fan et al., "Concept-Oriented Indexing of Video Databases: Toward Semantic Sensitive Retrieval and Browsing", IEEE Transactions on Image Processing, vol. 13, No. 7, Jul. 2004, p. 1.
John L. Johnson., Pulse-coupled neural nets: Translation, rotation, scale, distortion, and intensity signal invariance for images, vol. 33, No. 26, Applied Optics, Sep. 10, 1994, pp. 6239-6253.
Odinaev et al., "Cliques in Neural Ensembles as Perception Carriers", 2006 International Joint Conference on Neural Networks Sheraton Vancouver Wail Centre Hotel, Vancouver, BC, Canada Jul. 16-21, 2006, pp. 285-292.
Kabary et al., "SportSense: Using Motion Queries to Find Scenes in Sports Videos", DOI: 10.1145/2505515.2508211, Oct. 2013, pp. 2489-2491.
Keiji Yanai., "Generic Image Classification Using Visual Knowledge on the Web", DOI: 10.1145/957013.957047, Jan 2003, pp. 167-176.
Lau et al., "Semantic Web Service Adaptation Model for a Pervasive Learning Scenario", Proceedings of the 2008 IEEE Conference on innovative Technologies in Intelligent Systems and Industrial Applications Multimedia University, Cyberjaya, Malaysia. Jul. 12-13 , 2008, pp. 98-103.
Li et al., "Matching Commercial Clips from TV Streams Using a Unique, Robust and Compact Signature", DOI: 10.1109/DICTA.2005.52, Jan 2006, pages 7.
Lin et al., "Generating Robust Digital Signature for ImageNideo Authentication", Multimedia and Security Workshop at ACM Multimedia '98. Bristol. U.K., Sep. 1998, pp. 49-54.
Loytynoja et al., "Audio Encryption Using Fragile Watermarking", DOI: 10.1109/ICICS.2005.1689175, Jul 2015, pp. 881-885.
Richard F. Lyon., "Computational Models of Neural Auditory Processing", DOI: 10.1109/ICASSP.1984.1172756, ICASSP '84. IEEE International Conference on Acoustics, Speech, and Signal Processing, Jan. 29, 2003, pages 5.
Maass et al., "Computational Models for Generic Cortical Microcircuits", DOI: 10.1201/9780203494462.ch18, Jun. 10, 2003, pp. 1-26.
Mandhaoui et al., "Emotional speech characterization based on multi-features fusion for face-to-face interaction", 2009 International conference on signals, circuits and systems ,DOI: 10.1109/ICSCS.2009.5412691, Dec. 2009, pp. 1-6.
May et al., "The Transputer", Neural Computers. Springer Study Edition, vol. 41. Springer, Berlin, Heidelberg, DOI: 10.1007/978-3-642-83740-1_48, Jan. 1989 pp. 477-486.
McNamara et al., "Diversity Decay in Opportunistic Content Sharing Systems", DOI: 10.1109/WoWMoM.2011.5986211 2011 IEEE International Symposium on a World of Wireless, Mobile and Multimedia Networks Aug. 15, 2011, pp. 1-3.
Mei et al., "Contextual in-image Advertising",MM'OS, Oct. 26-31, 2008. Vancouver, British Columbia, Canada. Copyright 2008 ACM 978-1-60558-303-7/08/10, DOI: 10.1145/1459359.1459418 • Source: DBLP, Jan. 2008, pp. 439-448.
Mei et al., "VideoSense- Towards Effective Online Video Advertising", MM'07, Sep. 23-28, 2007, Augsburg, Bavaria, Germany. Copyright 2007 ACM 978-1-59593-701-Aug. 7, 0009 . . .$5.00, Jan. 2007, pp. 1075-1084.
Mladenovic et al., "Electronic Tour Guide for Android Mobile Platform with Multimedia Travel Book" 20th Telecommunications forum Telfor 2012, DOI: 10.1109/Telfor.2012.6419494, Nov. 20-22, 2012, pp. 1460-1463.
Morad et al., "Performance, Power Efficiency and Scalability of Asymmetric Cluster Chip Multiprocessors", IEEE Computer Architecture Letters, vol. 5, 2006, DOI 10.1109/L-CA.2006.6, Jul. 5, 2006, pp. 4.

(56) References Cited

OTHER PUBLICATIONS

Nagy et al., "A Transputer Based, Flexible, Real-Time Control System for Robotic Manipulators", UKACC International Conference on Control '96, Conference Publication No. 427 © IEE 1996, Sep. 2-5 1996, pp. 84-89.
Nam et al., "Audio-Visual Content-Based Violent Scene Characterization", Proceedings 1998 International Conference on Image Processing. ICIP98 (Cat. No. 98CB36269), DOI: 10.1109/ICIP.1998.723496, pp. 353-357.
Natschlager et al., "The "Liquid Computer": a Novel Strategy for Real-Time Computing on Time Series", Jan. 2002,44 pp. 1-7.
Nouza et al., "Large-Scale Processing, Indexing and Search System for Czech Audio-Visual Cultural Heritage Archives", DOI: 10.1109/Mmsp.2012.6343465, Sep. 2012, pp. 337-342.
Odinaev., "Cliques to Neural Ensembles as Perception Carriers", 2006 International Joint Conference on Neural Networks Sheraton Vancouver Wail Centre Hotel, Vancouver, BC, Canada, DOI: 10.1109/IJCNN.2006.246693, Jul. 16-21, 2006, pp. 285-292.
Park et al., "Compact Video Signatures for Near-Duplicate Detection on Mobile Devices", DOI: 10.1109/ISCE.2014.6884293, Jun. 2014, pp. 1-2.
Maria Paula Queluz., "Content-based integrity protection of digital images", San Jose. California •Jan. 1999 SPIE vol. 3657.0277-786X/99/$10.00, DOI: 10.1117/12.344706, Apr. 1999, pp. 85-93.
Raichelgauz et al., "Co-evoletiooary Learning in Liquid Architectures", DOI: 10.1007/11494669_30, Jun 2005, pp. 241-248.
Ribert et al., "An Incremental Hierarchical Clustering", Vision Interface '99, Trois-Rivieres, Canada, May 19-21, pp. 586-591.
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Zhou et al, "Medical Diagnosis With C4.5 Rule Preceded by Artificial Neural Network Ensemble", IEEE Transactions pri Information Technology in Biomedicine, vol. 7, Issue: 1, Mar. 2003, pp. 37-42.
Zhu et al., "Technology-Assisted Dietary Assesment", PROC SPIE. 2008 Mar. 20, pp. 1-15.
Zou et al., "A Content-Based Image Authentication System with Lossless Data Hiding", ICME 2003, pp. 213-216.
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation for Backpropagation Neural Network Using Mimd Architecture", 8th Mediterranean Electrotechnical Conference, 19'96. MELECON '96, Date of Conference: May 13-16, 1996, Volume: 3 Pages, 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International conference on Image Processing (ICIP), vol. 1, IEEE, pp. 685-688, 2004.
International Search Report and Written Opinion for PCT/US2016/050471, ISA/RU, Moscow, RU, dated May 34, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, datd Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from Tv Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161 - 173.
Lyon, "Computational Models of Neural Auditory Processing", IEEE International Conference on Acoustics, Speech, and Signal Processing, ICASSP '84, Date of Conference: Mar 1984, vol. 9, pp. 41-44.
Ma Et El "Semantics modeling based image retrieval system using neural networks", 2005.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International conference on Control '96, 2-5 Sep. 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Drtiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. On Security and Watermarking of Multimedia Contents, San Jose, Jan. 1999, pp. 85-93.

(56) References Cited

OTHER PUBLICATIONS

Rui, Yong et al. "Relevance feedback: A power tool for interactive content-based image retrieval." IEEE Transactions on circuits and systems for video technology 8.5 (1998): 644-655.
Santos et al., "SCORM-MPEG: An Ontology of Interoperable Metadata for multimediaand E-Leaming", 23rd International Conference on Software, Telecommunications and Computer Networks (SoftCom), 2015, pp. 224-228.
Scheper et al, "Nonlinear dynamics in neural computation", Esann'2006 proceedings - European Symposium on Artificial Neural Networks, Bruges (Belgium), 26-28 Apr. 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("HIBRID-SOC: A Multi-Core Soc Architecture for Multimedia Signal Processing" 2003).
Stolberg et al, "HIBRID-SOC: A Mul Ti-Core Soc Architecture for Multimedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: A case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Vorkshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.

* cited by examiner

9800

9830

4900

SIGNATURE GENERATION AND OBJECT DETECTION THAT REFER TO RARE SCENES

CROSS REFERENCE

This application claims priority from U.S. provisional No. 62/827,117 filing date Mar. 31, 2019 and from U.S. provisional patent 62/827,122 filing date Mar. 31, 2019, both are incorporated herein by reference.

BACKGROUND

Object detection has extensive usage in variety of applications, starting from security, sport events, automatic vehicles, and the like.

Vast amounts of media units are processed during object detection and their processing may require vast amounts of computational resources and memory resources.

Furthermore—many object detection process are sensitive to various acquisition parameters such as angle of acquisition, scale, and the like.

There is a growing need to provide robust and efficient object detection methods.

SUMMARY

There may be provided systems, methods and computer readable medium as illustrated in the specification.

Any combination of any subject matter disclosed in any one of U.S. provisional No. 62/827,117 and U.S. provisional patent 62/827,122 may be provided.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
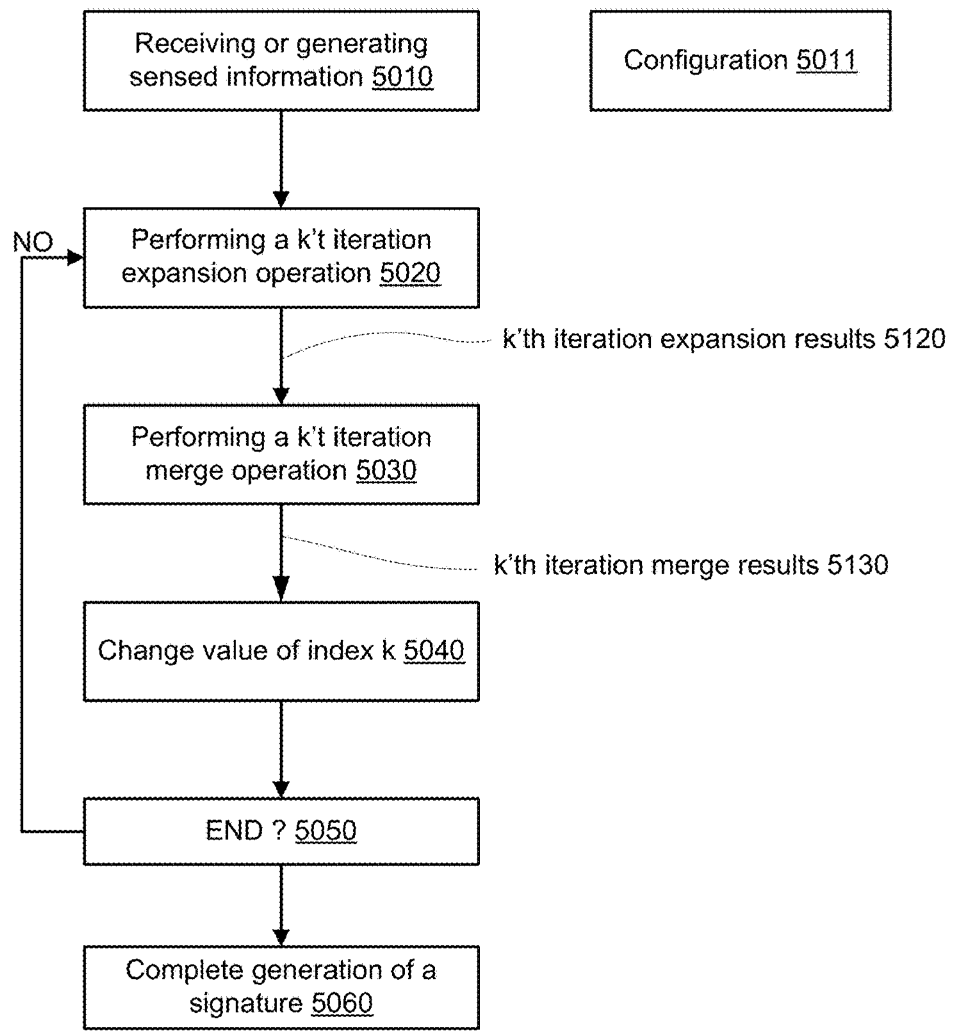
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The signature may be generated by creating a multidimensional representation of the media unit. The multidimensional representation of the media unit may have a very large number of dimensions. The high number of dimensions may guarantee that the multidimensional representation of different media units that include different objects is sparse—and that object identifiers of different objects are distant from each other—thus improving the robustness of the signatures.

The term "rare scene" may mean a scene that is seldom occurring or seldom found or a scene that includes any secne portion that is seldom occurring or seldom found. A scene portion may be an object captured in the scene, a combination of one of more object, an event or a part of an event (for example a dog that jumps in front of a vehicle) captured by the scene.

Any reference in the application to a scene it is applicable, mutatis mutandis, to a scene portion. A rare scene may be a scene that includes a rare scene portion.

The occurrence of the rare scene may me much lower (for example below a certain threshold such as 1, 2, 3, 4, 5, 6, 7, 8, 9, 10%) of an occurrence of other non-rare scenes in one or more collections of scenes. The scene may be rare if a machine learning process is unable to identify the rare scene. The scene may be rare if a detection of the rare scene by a machine learning process, is substantially less reliable (for example by a factor of at least ten, twenty, fifty, one hundred and more) than a detection of a common scene. A scene may be regarded as a rare scene by a human or by an automated process. Any method for classifying a scene as a rare scene may be used. For example—a rare scene may be a scene that is expected to surprise a human driver.

The rarity of the scene may be determined based on the cluster structures and/or may be based on a complexity of the scene. For example—a complex scene that should be represented by cluster having a first number (N1) of signatures may be regarded rare if the cluster has only a fraction of the first number of signatures and the lack of sufficient signatures will result in a substantial reduction in the ability to detect the complex scene.

The term "scene" may include a situation, a place of occurrence or action, a single object, a combination of objects, a portion of a scene, and the like.

There may be provided a method for updating an object detector, the method may include receiving an image of a rare scene and a request to update the object detector to detect a rare object that appears in the rare scene; calculating, by a signature generator, a signature of the image of the rare scene; wherein the signature of the rare scene includes a certain number of object identifiers; calculating, by the signature generator, reference signatures of a large number of reference images; searching for reference signatures that match the signature of the rare scene to provide matching reference signatures; generating a cluster that may include the signature of the rare scene and the matching reference signatures; generating one or more cluster identifiers, each cluster identifier may include a set of object identifiers that may be shared by at least a predefined number of signatures of the cluster; wherein a number of object identifiers per set may be smaller than the certain number; and associating the one or more cluster identifiers with the object detector.

The object identifiers may be retrieval information for retrieving the significant portions.

Each cluster identifier may include do not care (don't care) object identifiers and object identifiers of the set of object identifiers that may be shared by at least the predefined number of signatures of the cluster.

The method may include evaluating object detection capabilities of the concept.

The method may include receiving an indication that a first image that has a first signature was falsely detected, by the object detector, as including the rare object; wherein the false detection occurred after the associating of the one or more cluster identifiers with the object detector; searching for first reference signatures that match the first signature to provide first reference signatures; generating a first false positive cluster that may include the first signature and the first reference signatures; generating one or more false positive cluster identifiers, each false positive cluster identifier may include a set of object identifiers that may be shared by at least a predefined number of signatures of the false positive cluster; removing from the cluster at least one part of at least one signature based on the one or more false positive cluster identifiers.

The removing may include removing at least a part of a signature of the compressed concept that may include at least one set of object identifiers that may be shared by the at least predefined number of signatures of the false positive cluster.

The removing may include removing at least a part of a signature of the compressed concept that may include at least one subset out of a set of object identifiers that may be shared by the at least predefined number of signatures of the false positive cluster.

The method may include validating object detection capabilities of the cluster.

The method may include compressing the cluster to provide a compressed cluster by replacing the signature of the cluster by the one or more cluster identifiers; and wherein the associating of the one or more cluster identifiers with the object detector may include associating the compressed cluster with the object detector.

The method may include receiving an indication that a first image that has a first signature was falsely detected, by the object detector, as including the rare object; wherein the false detection occurred after the associating of the one or more cluster identifiers with the object detector; searching for first reference signatures that match the first signature to provide first reference signatures; generating a first false positive cluster that may include the first signature and the first reference signatures; generating one or more false positive cluster identifiers, each false positive cluster identifier may include a set of object identifiers that may be shared by at least a predefined number of signatures of the false positive cluster; and removing from the compressed cluster at least a subset of the one or more sets of object identifiers that may be shared by at least the predefined number of signatures of the false positive cluster.

The method may include receiving a miss-detection indication that indicates that an image that may include the rate object and has a second signature was not detected, by the object detector; wherein the miss-detection occurred after the associating of the one or more cluster identifiers with the object detector; searching for second reference signatures that match the second signature to provide second reference signatures; generating a second false negative cluster that may include the second signature and the second reference signatures; generating one or more false negative cluster identifiers, each false negative cluster identifier may include a set of object identifiers that may be shared by at least a predefined number of signatures of the false positive cluster; adding to the cluster at least one false negative cluster identifier.

The method may include validating object detection capabilities of the cluster.

The method may include compressing the cluster to provide a compressed cluster by replacing the signature of the cluster by the one or more cluster identifiers; wherein the associating of the one or more cluster identifiers with the object detector may include associating the compressed cluster with the object detector; receiving a miss-detection indication that indicates that an image that may include the rate object and has a second signature was not detected, by the object detector; wherein the miss-detection occurred after the associating of the one or more cluster identifiers with the object detector; searching for second reference signatures that match the second signature to provide second reference signatures; generating a second false negative cluster that may include the second signature and the second reference signatures; generating one or more false negative cluster identifiers, each false negative cluster identifier may include a set of object identifiers that may be shared by at least a predefined number of signatures of the false positive cluster; adding to the compressed cluster at least one false negative cluster identifier.

The method may include validating object detection capabilities of the compressed cluster.

There may be provided a method for object detection, the method may include receiving an input image; calculating by a signature generator an input image signature; searching for at least one matching concept structure; and determining that the input image may include an object identified by a matching concept—when a matching concept may be found; wherein the receiving of the input image may be preceded by any of the steps mentioned above.

There may be provided non-transitory computer readable medium for updating an object detector, the non-transitory computer readable medium stores instructions for receiving an image of a rare scene and a request to update the object detector to detect a rare object that appears in the rare scene; calculating, by a signature generator, a signature of the image of the rare scene; wherein the signature of the rare scene includes a certain number of object identifiers; calculating, by the signature generator, reference signatures of a large number of reference images; searching for reference signatures that match the signature of the rare scene to provide matching reference signatures; generating a cluster that may include the signature of the rare scene and the matching reference signatures; generating one or more cluster identifiers, each cluster identifier may include a set of object identifiers that may be shared by at least a predefined number of signatures of the cluster; wherein a number of object identifiers per set may be smaller than the certain number; and associating the one or more cluster identifiers with the object detector.

The object identifiers may be retrieval information for retrieving the significant portions.

Each cluster identifier may include do not care object identifiers and object identifiers of the set of object identifiers that may be shared by at least the predefined number of signatures of the cluster.

The non-transitory computer readable medium that may store instructions for evaluating object detection capabilities of the concept.

The non-transitory computer readable medium that may store instructions for receiving an indication that a first image that has a first signature was falsely detected, by the object detector, as including the rare object; wherein the false detection occurred after the associating of the one or more cluster identifiers with the object detector; searching for first reference signatures that match the first signature to provide first reference signatures; generating a first false positive cluster that may include the first signature and the first reference signatures; generating one or more false positive cluster identifiers, each false positive cluster identifier may include a set of object identifiers that may be shared by at least a predefined number of signatures of the false positive cluster; removing from the cluster at least one part of at least one signature based on the one or more false positive cluster identifiers.

The removing may include removing at least a part of a signature of the compressed concept that may include at least one set of object identifiers that may be shared by the at least predefined number of signatures of the false positive cluster.

The removing may include removing at least a part of a signature of the compressed concept that may include at least one subset out of a set of object identifiers that may be shared by the at least predefined number of signatures of the false positive cluster.

The non-transitory computer readable medium that may store instructions for validating object detection capabilities of the cluster.

The non-transitory computer readable medium that may store instructions for compressing the cluster to provide a compressed cluster by replacing the signature of the cluster by the one or more cluster identifiers; and wherein the associating of the one or more cluster identifiers with the object detector may include associating the compressed cluster with the object detector.

The non-transitory computer readable medium that may store instructions for receiving an indication that a first image that has a first signature was falsely detected, by the object detector, as including the rare object; wherein the false detection occurred after the associating of the one or more cluster identifiers with the object detector; searching for first reference signatures that match the first signature to provide first reference signatures; generating a first false positive cluster that may include the first signature and the first reference signatures; generating one or more false positive cluster identifiers, each false positive cluster identifier may include a set of object identifiers that may be shared by at least a predefined number of signatures of the false positive cluster; and removing from the compressed cluster at least a subset of the one or more sets of object identifiers that may be shared by at least the predefined number of signatures of the false positive cluster.

The non-transitory computer readable medium that may store instructions for receiving a miss-detection indication that indicates that an image that may include the rate object and has a second signature was not detected, by the object detector; wherein the miss-detection occurred after the associating of the one or more cluster identifiers with the object detector; searching for second reference signatures that match the second signature to provide second reference signatures; generating a second false negative cluster that may include the second signature and the second reference signatures; generating one or more false negative cluster identifiers, each false negative cluster identifier may include a set of object identifiers that may be shared by at least a predefined number of signatures of the false positive cluster; adding to the cluster at least one false negative cluster identifier.

The non-transitory computer readable medium that may store instructions for validating object detection capabilities of the cluster.

The non-transitory computer readable medium that may store instructions for compressing the cluster to provide a compressed cluster by replacing the signature of the cluster by the one or more cluster identifiers; wherein the associating of the one or more cluster identifiers with the object detector may include associating the compressed cluster with the object detector; receiving a miss-detection indication that indicates that an image that may include the rate object and has a second signature was not detected, by the object detector; wherein the miss-detection occurred after the associating of the one or more cluster identifiers with the object detector; searching for second reference signatures that match the second signature to provide second reference signatures; generating a second false negative cluster that may include the second signature and the second reference signatures; generating one or more false negative cluster identifiers, each false negative cluster identifier may include a set of object identifiers that may be shared by at least a predefined number of signatures of the false positive cluster; adding to the compressed cluster at least one false negative cluster identifier.

The non-transitory computer readable medium that may store instructions for validating object detection capabilities of the compressed cluster.

There may be provided non-transitory computer readable medium for object detection, the non-transitory computer readable medium stores instructions for receiving an input image; calculating by a signature generator an input image signature; searching for at least one matching concept structure; and determining that the input image may include an object identified by a matching concept—when a matching concept may be found; wherein the receiving of the input image may be preceded by executing the instructions listed above.

There may be provided a system that may be configured to execute any of the steps mentioned above.

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The signature may be generated by creating a multidimensional representation of the media unit. The multidimensional representation of the media unit may have a very large number of dimensions. The high number of dimensions may guarantee that the multidimensional representation of different media units that include different objects is sparse—and that object identifiers of different objects are distant from each other—thus improving the robustness of the signatures.

The generation of the signature is executed in an iterative manner that includes multiple iterations, each iteration may include an expansion operations that is followed by a merge operation. The expansion operation of an iteration is performed by spanning elements of that iteration.

FIG. 1 illustrates a method 5000 for generating a signature of a media unit.

Method 5000 may start by step 5010 of receiving or generating sensed information.

The sensed information may be a media unit of multiple objects.

Step 5010 may be followed by processing the media unit by performing multiple iterations, wherein at least some of the multiple iterations comprises applying, by spanning elements of the iteration, dimension expansion process that are followed by a merge operation.

The processing may include:

Step 5020 of performing a k'th iteration expansion process (k may be a variable that is used to track the number of iterations).

Step 5030 of performing a k'th iteration merge process.

Step 5040 of changing the value of k.

Step 5050 of checking if all required iterations were done—if so proceeding to step 5060 of completing the generation of the signature. Else—jumping to step 5020.

The output of step 5020 is a k'th iteration expansion results 5120.

The output of step 5030 is a k'th iteration merge results 5130.

For each iteration (except the first iteration)—the merge result of the previous iteration is an input to the current iteration expansion process.

The method may include step 5011 of configuring the spanning elements. Step 5011 may include, for example, the steps of method 9400 of FIG. 5. Alternatively—step 5020 may be executed by spanning elements that are configured according to method 9400.

Non-limiting examples of various steps of FIG. 1 are illustrated in U.S. provisional patent 62/827,122.

Figure 2:
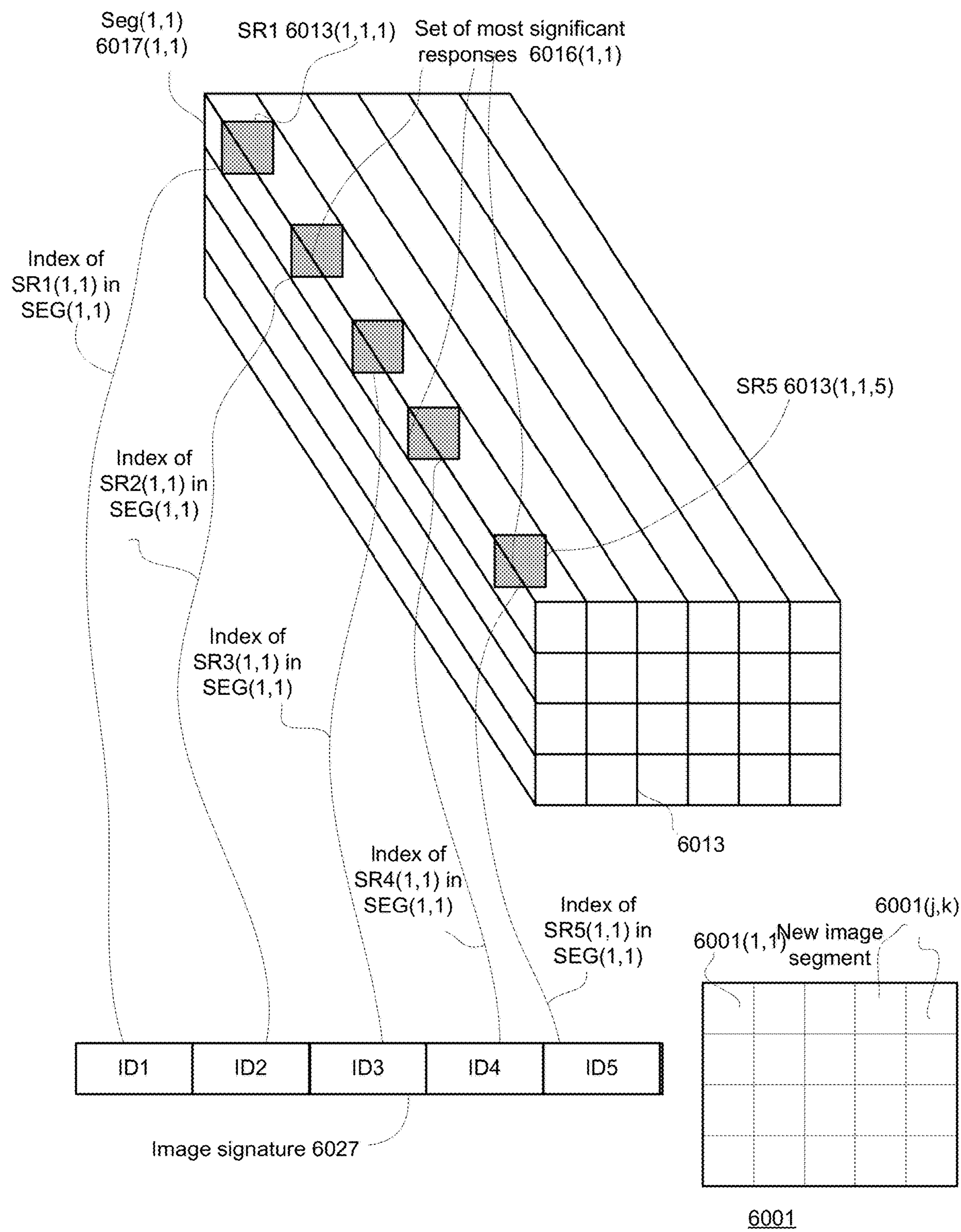
FIG. 2 illustrates an example of a signature.
Figure 3:
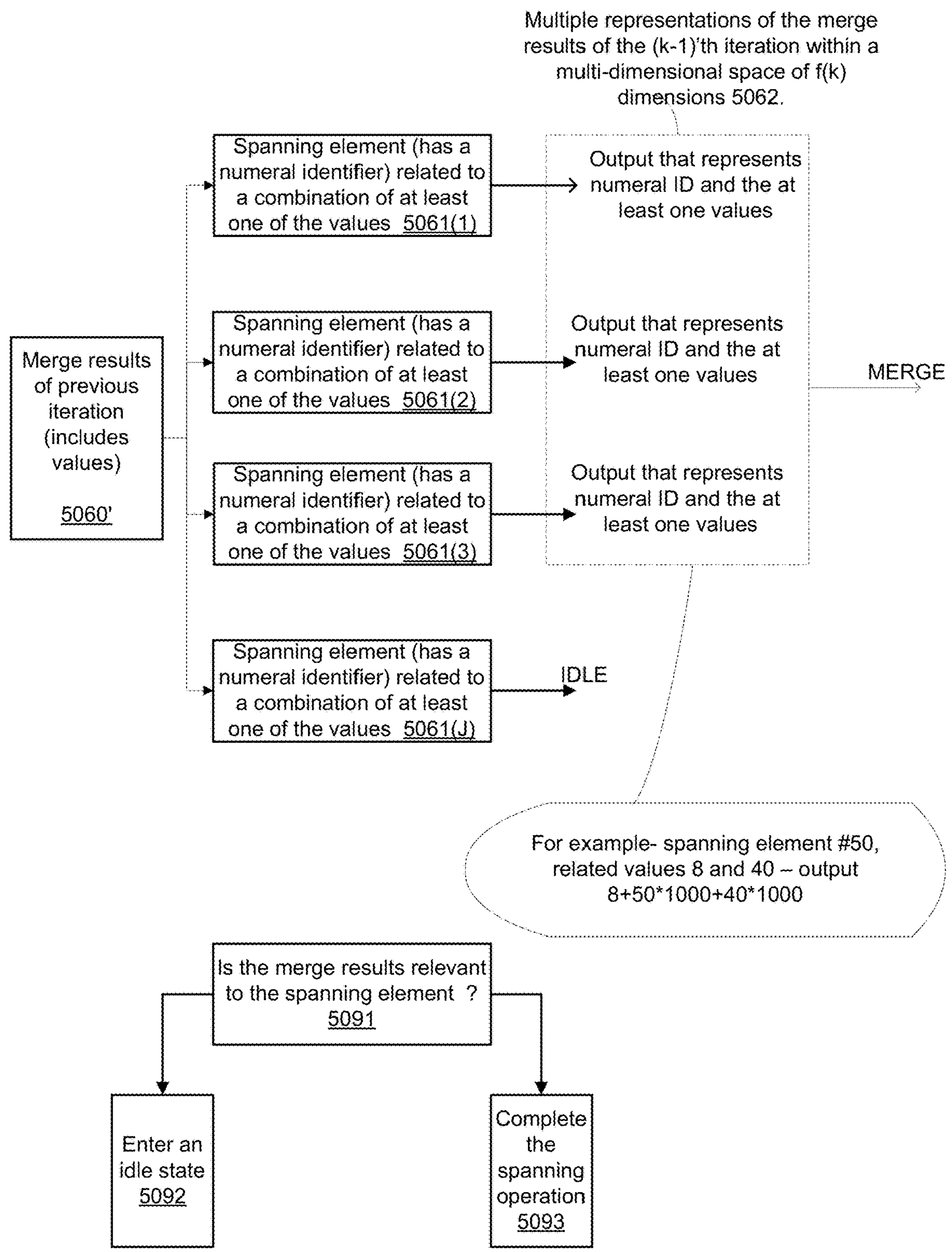
FIG. 3 illustrates an example of a dimension expansion process.

FIG. 2 is an example of a signature 6027 of a media unit that is an image 6000 and of an outcome 6013 of the last (K'th) iteration.

The image 6001 is virtually segments to segments 6000(*i,k*). The segments may be of the same shape and size but this is not necessarily so.

Outcome 6013 may be a tensor that includes a vector of values per each segment of the media unit. One or more objects may appear in a certain segment. For each object—an object identifier (of the signature) points to locations of significant values, within a certain vector associated with the certain segment.

For example—a top left segment (6001(1,1)) of the image may be represented in the outcome 6013 by a vector V(1,1) 6017(1,1) that has multiple values. The number of values per vector may exceed 100, 200, 500, 1000, and the like.

The significant values (for example—more than 10, 20, 30, 40 values, and/or more than 0.1%, 0.2%. 0.5%, 1%, 5% of all values of the vector and the like) may be selected. The significant values may have the values—but may eb selected in any other manner.

FIG. 2 illustrates a set of significant responses 6015(1,1) of vector V(1,1) 6017(1,1). The set includes five significant values (such as first significant value SV1(1,1) 6013(1,1,1), second significant value SV2(1,1), third significant value SV3(1,1), fourth significant value SV4(1,1), and fifth significant value SV5(1,1) 6013(1,1,5).

The image signature 6027 includes five indexes for the retrieval of the five significant values—first till fifth identifiers ID1-ID5 are indexes for retrieving the first till fifth significant values.

Figure 4:
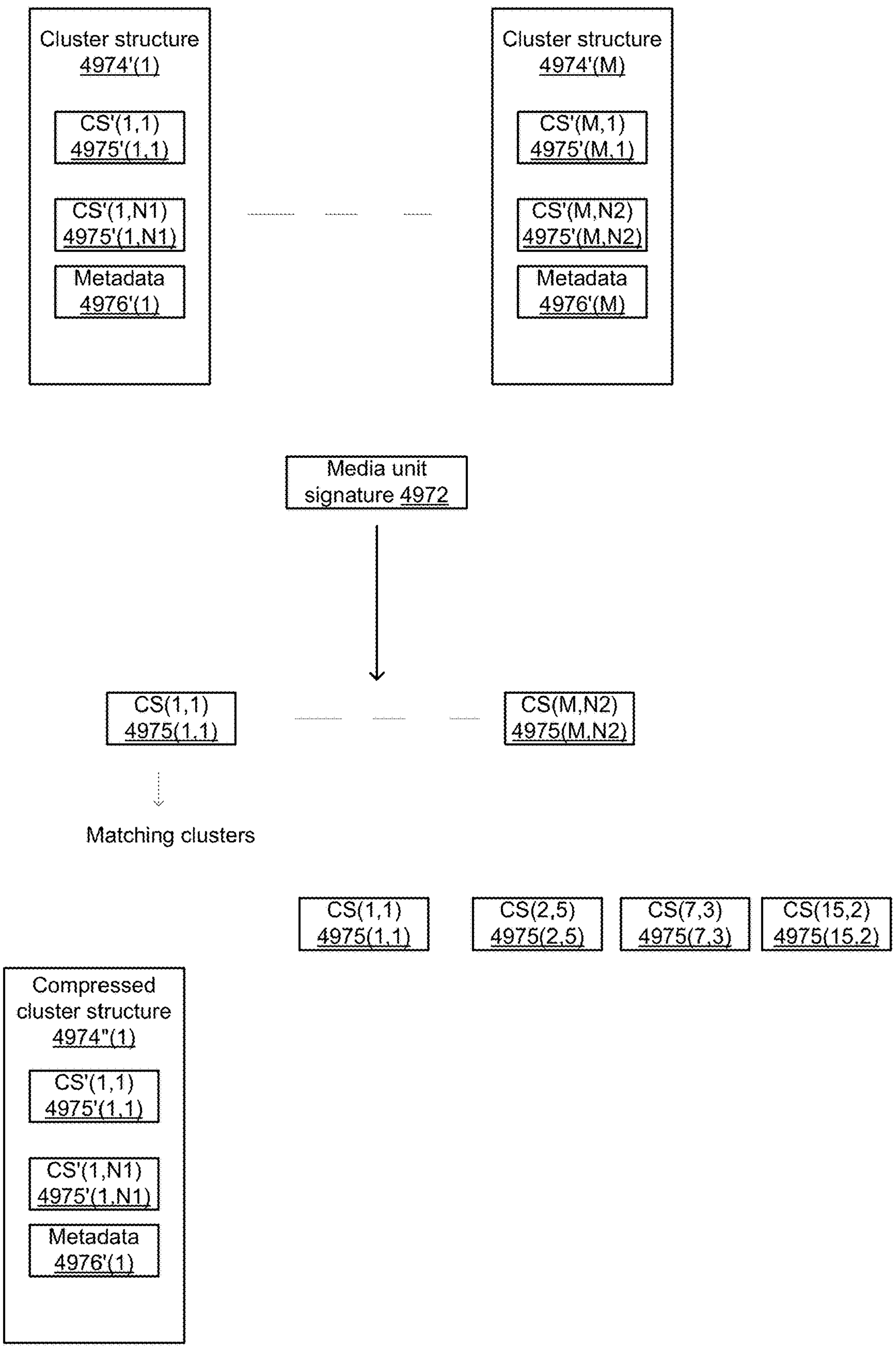
FIG. 4 illustrates an example of a matching process.

FIG. 4 illustrates an example of a clusters of a signatures matching process.

It is assumed that there are multiple (M) cluster structures 4974(1)-4974(M). Each cluster structure includes cluster signatures, metadata regarding the cluster signatures.

For example—first cluster structure 4974(1) includes multiple (N1) signatures (referred to as cluster signatures CS) CS(1,1)-CS(1,N1) 4975(1,1)-4975(1,N1) and metadata 4976(1).

Yet for another example—M'th cluster structure 4974(M) includes multiple (N2) signatures (referred to as cluster signatures CS) CS(M,1)-CS(M,N2) 4975(M,1)-4975(M,N2) and metadata 4976(M).

FIG. 4 also illustrates a media unit signature 4972 that is compared to the signatures of the M cluster structures—from CS(1,1) 4975(1,1) till CS(M,N2) 4975(M,N2).

FIG. 4 also illustrates an example of a first compressed cluster structure in which the signatures (CS) were replaced by cluster identifiers CI(1,1)-CI(1,M1) 4979"(1)-4979"(M1).

Figure 5:
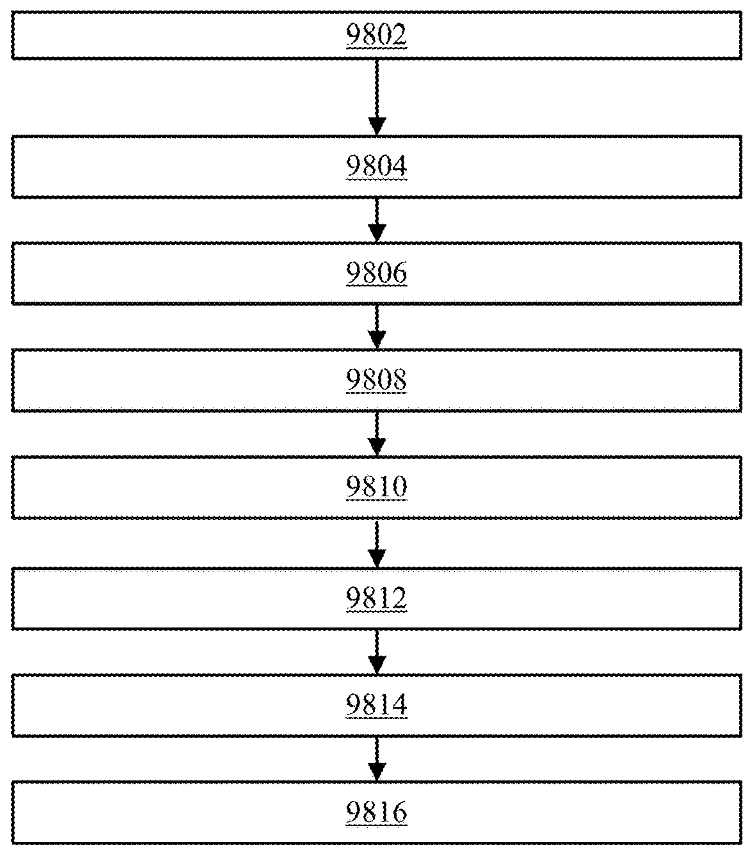
FIG. 5 illustrates an example of a method.
Figure 5:
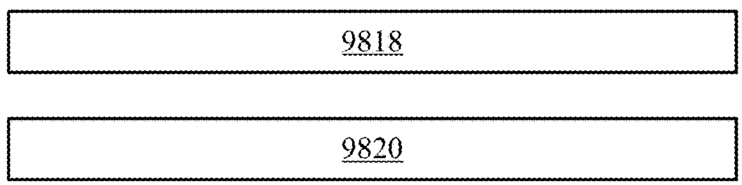

FIG. 5 illustrates method 9800 for updating an object detector.

Method 9800 may include the following steps:

Receiving an image of a rare scene and a request to update the object detector to detect a rare object (or other rare scene portion) that appears in the rare scene 9802. The scene may be rare if it was not detected in the past, if it includes a scene portion that is rare, if a user indicates that it is rare, if a user indicates that a scene portion is rare, whether its chances of appearance are below a threshold, and the like.

Calculating, by a signature generator, a signature of the image of the rare scene; wherein the signature of the rare scene includes a certain number of object identifiers 9804. For example—there may be few tens of object identifiers.

Calculating, by the signature generator, reference signatures of a large number of reference images 9806. The large number may exceed 100, 1000, 10000, 100000, 1000000 and the like. The large number of reference images may relate to a certain interest area such as driving scenes, medical information, and the like.

Searching for reference signatures that match the signature of the rare scene to provide matching reference signatures 9808.

Generating a cluster that may include the signature of the rare scene and the matching reference signatures 9810.

Generating one or more cluster identifiers, each cluster identifier may include a set of object identifiers that may be shared by at least a predefined number of signatures of the cluster 9812. A number of object identifiers per set may be smaller (for example less than 10, 20, 30, 40, 50, 60, 70%) than the certain number.

Associating the one or more cluster identifiers with the object detector. 9814. The association allows the object detector to perform future object detection processes while benefitting from the one or more cluster identifiers.

The object identifiers may be retrieval information for retrieving the significant portions.

Each cluster identifier may include do not care (don't care) object identifiers and object identifiers of the set of object identifiers that may be shared by at least the predefined number of signatures of the cluster. Don't care objects identifiers may not be taken into account when performing match operations with incoming signatures.

The method may include evaluating (step 9816) object detection capabilities of the concept. The evaluation is aimed to see whether the concept mat detect the rare scene and maybe other scenes that were detected before the amendment. This may involve a supervised process during which the performance of the object detector are measured (the performance may be measured, for example, by false positives, false negatives, true positives, true negative and the like). If the amendments deteriorates (at least above a threshold) the capabilities of the object detector than the amendment may be reconsiders, another amendment may be made, and the like.

Method 9800 may include a false positive correction process 9818.

Examples of this process are provided below:

Receiving an indication that a first image that has a first signature was falsely detected, by the object detector, as including the rare object; wherein the false detection occurred after the associating of the one or more cluster identifiers with the object detector.

Searching for first reference signatures that match the first signature to provide first reference signatures.

Generating a first false positive cluster that may include the first signature and the first reference signatures.

Generating one or more false positive cluster identifiers, each false positive cluster identifier may include a set of object identifiers that may be shared by at least a predefined number (at least 5, 10, 15, 20, 25, 30, 35, 40, 45, 50, 55, 60, 65, 70, 75, 80, 85 and 90%) of signatures of the false positive cluster.

Removing from the cluster at least one part (at least one object identifier) of at least one signature based on the one or more false positive cluster identifiers.

The removing may include removing at least a part of a signature of the compressed concept that may include at least one set of object identifiers that may be shared by the at least predefined number of signatures of the false positive cluster.

The removing may include removing at least a part of a signature of the compressed concept that may include at least one subset out of a set of object identifiers that may be shared by the at least predefined number of signatures of the false positive cluster.

Validating object detection capabilities of the cluster.

Compressing the cluster to provide a compressed cluster by replacing the signature of the cluster by the one or more cluster identifiers; and wherein the associating of the one or more cluster identifiers with the object detector may include associating the compressed cluster with the object detector.

Receiving an indication that a first image that has a first signature was falsely detected, by the object detector, as including the rare object; wherein the false detection occurred after the associating of the one or more cluster identifiers with the object detector.

Searching for first reference signatures that match the first signature to provide first reference signatures.

Generating a first false positive cluster that may include the first signature and the first reference signatures.

Generating one or more false positive cluster identifiers, each false positive cluster identifier may include a set of object identifiers that may be shared by at least a predefined number of signatures of the false positive cluster.

Removing from the compressed cluster at least a subset of the one or more sets of object identifiers that may be shared by at least the predefined number of signatures of the false positive cluster.

Method 9800 may include a false positive correction process 9820.

Examples of this process are provided below:

Receiving a miss-detection indication that indicates that an image that may include the rate object and has a second signature was not detected, by the object detector; wherein the miss-detection occurred after the associating of the one or more cluster identifiers with the object detector.

Searching for second reference signatures that match the second signature to provide second reference signatures Generating a second false negative cluster that may include the second signature and the second reference signatures.

Generating one or more false negative cluster identifiers, each false negative cluster identifier may include a set of object identifiers that may be shared by at least a predefined number of signatures of the false positive cluster.

Adding to the cluster at least one false negative cluster identifier.

Validating object detection capabilities of the cluster.

Compressing the cluster to provide a compressed cluster by replacing the signature of the cluster by the one or more cluster identifiers; wherein the associating of the one or more cluster identifiers with the object detector may include associating the compressed cluster with the object detector.

Receiving a miss-detection indication that indicates that an image that may include the rate object and has a second signature was not detected, by the object detector; wherein the miss-detection occurred after the associating of the one or more cluster identifiers with the object detector.

Searching for second reference signatures that match the second signature to provide second reference signatures.

Generating a second false negative cluster that may include the second signature and the second reference signatures.

Generating one or more false negative cluster identifiers, each false negative cluster identifier may include a set of object identifiers that may be shared by at least a predefined number of signatures of the false positive cluster.

Adding to the compressed cluster at least one false negative cluster identifier.

Validating object detection capabilities of the compressed cluster.

Figure 6:
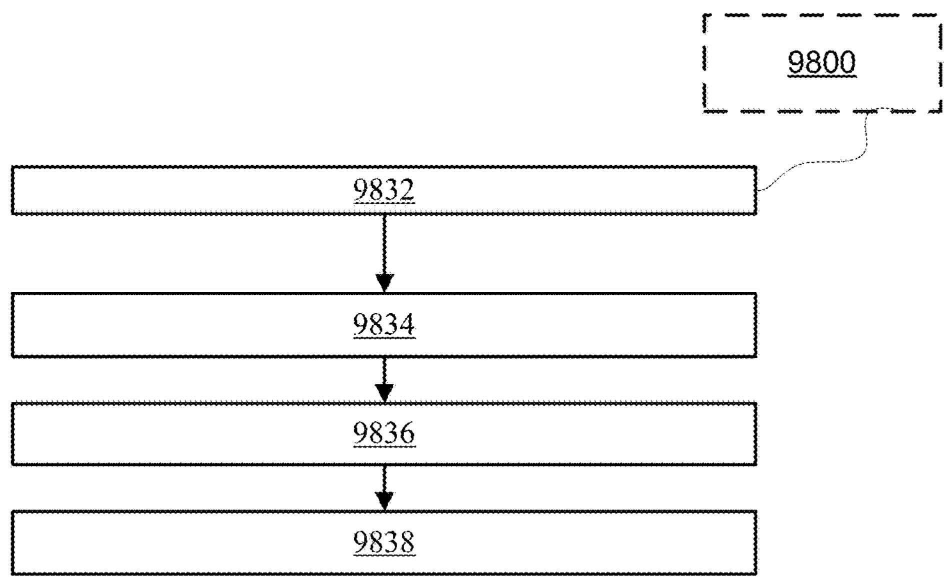
FIG. 6 illustrates an example of a method.

FIG. 6 illustrates method 9830.

Method 9830 may include the steps of:

Receiving an input image 9832.

Calculating by a signature generator an input image signature 9834.

Searching for at least one matching concept structure 9836.

Determining that the input image may include an object identified by a matching concept—when a matching concept may be found 9838.

Method 9830 may include or may preceded by method 9800.

Figure 7:
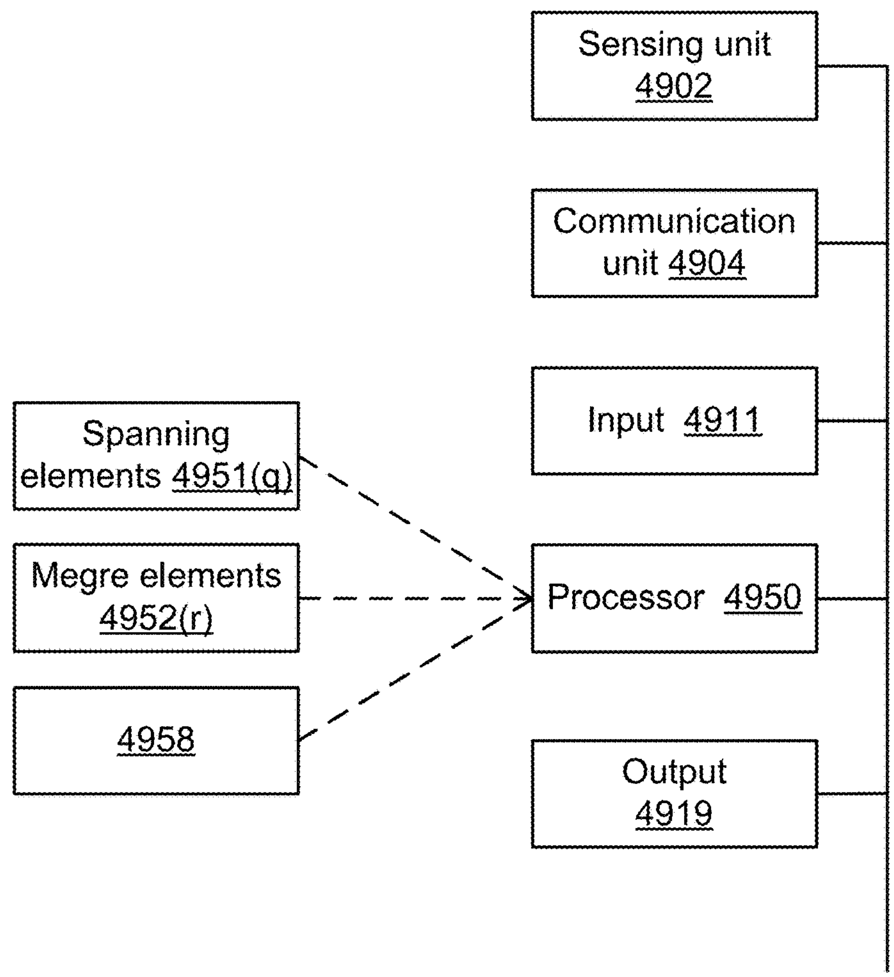
FIG. 7 illustrates an example of a system.

FIG. 7 illustrates an example of a system capable of executing one or more of the mentioned above methods.

The system include various components, elements and/or units.

A component element and/or unit may be a processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Alternatively, each component element and/or unit may implemented in hardware, firmware, or software that may be executed by a processing circuitry.

System 4900 may include sensing unit 4902, communication unit 4904, input 4911, processor 4950, and output 4919. The communication unit 4904 may include the input and/or the output.

Input and/or output may be any suitable communications component such as a network interface card, universal serial bus (USB) port, disk reader, modem or transceiver that may be operative to use protocols such as are known in the art to communicate either directly, or indirectly, with other elements of the system.

Processor 4950 may include at least some out of

Multiple spanning elements 4951($q$).

Multiple merge elements 4952($r$).

Object detector 4953.

Cluster manager 4954.

Controller 4955.

Selection unit 4956.

Object detection determination unit 4957.

Signature generator 4958.

Movement information unit 4959.

Identifier unit 4960.

Any of the methods illustrated in the specification may be executed by a processing circuitry that may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Alternatively, each component element and/or unit may implemented in hardware, firmware, or software that may be executed by a processing circuitry.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof

What is claimed is:

1. A method for updating an object detector, the method comprises:

receiving an image of a rare scene and a request to update the object detector to detect a rare object that appears in the rare scene;

calculating, by a signature generator, a signature of the image of the rare scene; wherein the signature of the rare scene includes a certain number of object identifiers;

calculating, by the signature generator, reference signatures of a large number of reference images;

searching for reference signatures that match the signature of the rare scene to provide matching reference signatures;

generating a cluster that comprises the signature of the rare scene and the matching reference signatures;

generating one or more cluster identifiers, each cluster identifier comprises a set of object identifiers that are shared by at least a predefined number of signatures of the cluster; wherein a number of object identifiers per set is smaller than the certain number; and associating the one or more cluster identifiers with the object detector.

2. The method according to claim 1 wherein the object identifiers are retrieval information for retrieving the significant portions.

3. The method according to claim 1 wherein each cluster identifier comprises do not care object identifiers and object identifiers of the set of object identifiers that are shared by at least the predefined number of signatures of the cluster.

4. The method according to claim 1 comprising evaluating object detection capabilities of the concept.

5. The method according to claim 1 comprising:

receiving an indication that a first image that has a first signature was falsely detected, by the object detector, as including the rare object; wherein the false detection occurred after the associating of the one or more cluster identifiers with the object detector;

searching for first reference signatures that match the first signature to provide first reference signatures;

generating a first false positive cluster that comprises the first signature and the first reference signatures;

generating one or more false positive cluster identifiers, each false positive cluster identifier comprises a set of object identifiers that are shared by at least a predefined number of signatures of the false positive cluster;

removing from the cluster at least one part of at least one signature based on the one or more false positive cluster identifiers.

6. The method according to claim 5 wherein the removing comprises removing at least a part of a signature of the compressed concept that comprises at least one set of object identifiers that are shared by the at least predefined number of signatures of the false positive cluster.

7. The method according to claim 5 wherein the removing comprises removing at least a part of a signature of the compressed concept that comprises at least one subset out of a set of object identifiers that are shared by the at least predefined number of signatures of the false positive cluster.

8. The method according to claim 5 comprising validating object detection capabilities of the cluster.

9. The method according to claim 1 comprising compressing the cluster to provide a compressed cluster by replacing the signature of the cluster by the one or more cluster identifiers; and wherein the associating of the one or more cluster identifiers with the object detector comprises associating the compressed cluster with the object detector.

10. The method according to claim 9 comprising:

receiving an indication that a first image that has a first signature was falsely detected, by the object detector, as including the rare object; wherein the false detection occurred after the associating of the one or more cluster identifiers with the object detector;

searching for first reference signatures that match the first signature to provide first reference signatures;

generating a first false positive cluster that comprises the first signature and the first reference signatures;

generating one or more false positive cluster identifiers, each false positive cluster identifier comprises a set of object identifiers that are shared by at least a predefined number of signatures of the false positive cluster; and removing from the compressed cluster at least a subset of the one or more sets of object identifiers that are shared by at least the predefined number of signatures of the false positive cluster.

11. The method according to claim 1 comprising:

receiving a miss-detection indication that indicates that an image that comprises the rate object and has a second signature was not detected, by the object detector; wherein the miss-detection occurred after the associating of the one or more cluster identifiers with the object detector;

searching for second reference signatures that match the second signature to provide second reference signatures;

generating a second false negative cluster that comprises the second signature and the second reference signatures;

generating one or more false negative cluster identifiers, each false negative cluster identifier comprises a set of object identifiers that are shared by at least a predefined number of signatures of the false positive cluster;

adding to the cluster at least one false negative cluster identifier.

12. The method according to claim 11 comprising validating object detection capabilities of the cluster.

13. The method according to claim 1 comprising:

compressing the cluster to provide a compressed cluster by replacing the signature of the cluster by the one or more cluster identifiers; wherein the associating of the one or more cluster identifiers with the object detector comprises associating the compressed cluster with the object detector;

receiving a miss-detection indication that indicates that an image that comprises the rate object and has a second signature was not detected, by the object detector; wherein the miss-detection occurred after the associating of the one or more cluster identifiers with the object detector;

searching for second reference signatures that match the second signature to provide second reference signatures;

generating a second false negative cluster that comprises the second signature and the second reference signatures;

generating one or more false negative cluster identifiers, each false negative cluster identifier comprises a set of object identifiers that are shared by at least a predefined number of signatures of the false positive cluster;

adding to the compressed cluster at least one false negative cluster identifier.

14. The method according to claim 13 comprising validating object detection capabilities of the compressed cluster.

15. The method according to claim 1 further comprising receiving an input image;

calculating by a signature generator an input image signature;

searching for at least one matching concept structure; and determining that the input image comprises an object identified by a matching concept—when a matching concept is found.

16. A non-transitory computer readable medium for updating an object detector, the non-transitory computer readable medium stores instructions for:

receiving an image of a rare scene and a request to update the object detector to detect a rare object that appears in the rare scene;

calculating, by a signature generator, a signature of the image of the rare scene; wherein the signature of the rare scene includes a certain number of object identifiers;

calculating, by the signature generator, reference signatures of a large number of reference images;

searching for reference signatures that match the signature of the rare scene to provide matching reference signatures;

generating a cluster that comprises the signature of the rare scene and the matching reference signatures;

generating one or more cluster identifiers, each cluster identifier comprises a set of object identifiers that are shared by at least a predefined number of signatures of the cluster; wherein a number of object identifiers per set is smaller than the certain number;

and associating the one or more cluster identifiers with the object detector.

17. The non-transitory computer readable medium according to claim 16 wherein the object identifiers are retrieval information for retrieving the significant portions.

18. The non-transitory computer readable medium according to claim 16 wherein each cluster identifier comprises do not care object identifiers and object identifiers of the set of object identifiers that are shared by at least the predefined number of signatures of the cluster.

19. The non-transitory computer readable medium according to claim 16 that stores instructions for evaluating object detection capabilities of the concept.

20. The non-transitory computer readable medium according to claim 16 that stores instructions for:

receiving an indication that a first image that has a first signature was falsely detected, by the object detector, as including the rare object; wherein the false detection occurred after the associating of the one or more cluster identifiers with the object detector;

searching for first reference signatures that match the first signature to provide first reference signatures;

generating a first false positive cluster that comprises the first signature and the first reference signatures;

generating one or more false positive cluster identifiers, each false positive cluster identifier comprises a set of object identifiers that are shared by at least a predefined number of signatures of the false positive cluster;

removing from the cluster at least one part of at least one signature based on the one or more false positive cluster identifiers.

21. The non-transitory computer readable medium according to claim 20 wherein the removing comprises removing at least a part of a signature of the compressed concept that comprises at least one set of object identifiers that are shared by the at least predefined number of signatures of the false positive cluster.

22. The non-transitory computer readable medium according to claim 20 wherein the removing comprises removing at least a part of a signature of the compressed concept that comprises at least one subset out of a set of object identifiers that are shared by the at least predefined number of signatures of the false positive cluster.

23. The non-transitory computer readable medium according to claim 20 that stores instructions for validating object detection capabilities of the cluster.

24. The non-transitory computer readable medium according to claim 16 that stores instructions for compressing the cluster to provide a compressed cluster by replacing the signature of the cluster by the one or more cluster identifiers; and wherein the associating of the one or more cluster identifiers with the object detector comprises associating the compressed cluster with the object detector.

25. The non-transitory computer readable medium according to claim 24 that stores instructions for:

receiving an indication that a first image that has a first signature was falsely detected, by the object detector, as including the rare object; wherein the false detection occurred after the associating of the one or more cluster identifiers with the object detector;

searching for first reference signatures that match the first signature to provide first reference signatures;

generating a first false positive cluster that comprises the first signature and the first reference signatures;

generating one or more false positive cluster identifiers, each false positive cluster identifier comprises a set of object identifiers that are shared by at least a predefined number of signatures of the false positive cluster; and removing from the compressed cluster at least a subset of the one or more sets of object identifiers that are shared by at least the predefined number of signatures of the false positive cluster.

26. The non-transitory computer readable medium according to claim 16 that stores instructions for:

receiving a miss-detection indication that indicates that an image that comprises the rate object and has a second signature was not detected, by the object detector; wherein the miss-detection occurred after the associating of the one or more cluster identifiers with the object detector;

searching for second reference signatures that match the second signature to provide second reference signatures;

generating a second false negative cluster that comprises the second signature and the second reference signatures;

generating one or more false negative cluster identifiers, each false negative cluster identifier comprises a set of object identifiers that are shared by at least a predefined number of signatures of the false positive cluster;

adding to the cluster at least one false negative cluster identifier.

27. The non-transitory computer readable medium according to claim 26 that stores instructions for validating object detection capabilities of the cluster.

28. The non-transitory computer readable medium according to claim 16 that stores instructions for:

compressing the cluster to provide a compressed cluster by replacing the signature of the cluster by the one or more cluster identifiers; wherein the associating of the one or more cluster identifiers with the object detector comprises associating the compressed cluster with the object detector;

receiving a miss-detection indication that indicates that an image that comprises the rate object and has a second signature was not detected, by the object detector; wherein the miss-detection occurred after the associating of the one or more cluster identifiers with the object detector;

searching for second reference signatures that match the second signature to provide second reference signatures;

generating a second false negative cluster that comprises the second signature and the second reference signatures;

generating one or more false negative cluster identifiers, each false negative cluster identifier comprises a set of object identifiers that are shared by at least a predefined number of signatures of the false positive cluster;

adding to the compressed cluster at least one false negative cluster identifier.

29. A system that comprises a communication unit and a processor, wherein the communication unit is configured to receive an image of a rare scene and a request to update the object detector to detect a rare object that appears in the rare scene; calculate, by a signature generator of the processor, a signature of the image of the rare scene; wherein the signature of the rare scene includes a certain number of object identifiers; calculate, by the signature generator, reference signatures of a large number of reference images; search for reference signatures that match the signature of the rare scene to provide matching reference signatures; generate a cluster that comprises the signature of the rare scene and the matching reference signatures; generate one or more cluster identifiers, each cluster identifier comprises a set of object identifiers that are shared by at least a predefined number of signatures of the cluster; wherein a number of object identifiers per set is smaller than the certain number; and associate the one or more cluster identifiers with the object detector.

30. The system according to claim 29 comprising a sensing unit that is configured to obtain an input image; wherein the signature generator is configured to calculate an input image signature; wherein the processor is configured to search for at least one matching concept structure; and determine that the input image comprises an object identified by a matching concept—when a matching concept is found.

* * * * *